Sept. 8, 1953 A. J. WAYMAN 2,651,529
WATERTIGHT CABLE CONNECTOR
Filed July 31, 1951
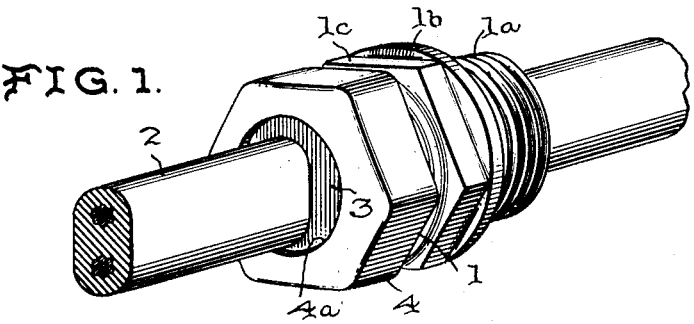
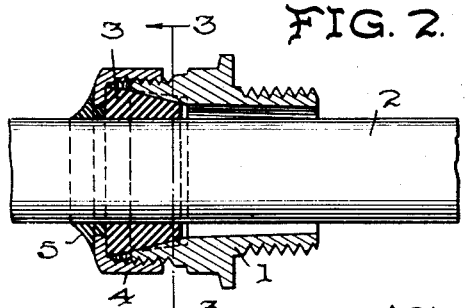
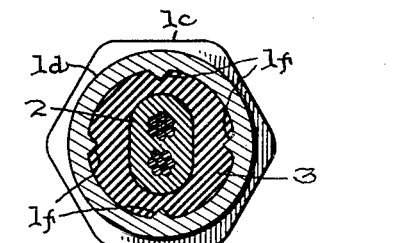
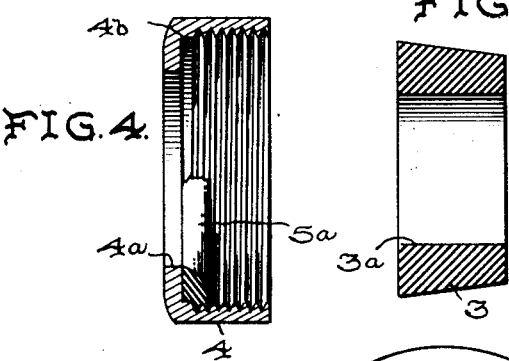
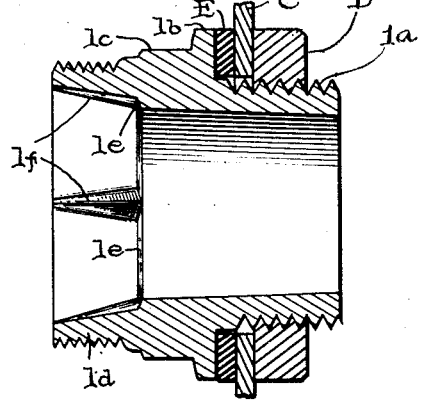
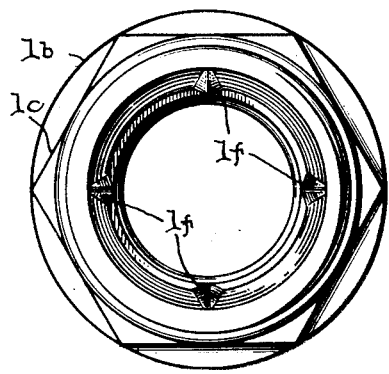
INVENTOR.
ALBERT J. WAYMAN
BY Ralph B. Stewart
attorney Patented Sept. 8, 1953

2,651,529

UNITED STATES PATENT OFFICE 2,651,529

WATERTIGHT CABLE CONNECTOR

Albert J. Wayman, East Palestine, Ohio

Application July 31, 1951, Serial No. 239,490

4 Claims. (Cl. 285—6.5)

This invention relates to electric cable connectors and in particular to a connector for making a water-tight and moisture-proof joint between an electric cable and a terminal box, meter casing or other housing member. The present invention is an improvement over the connector disclosed in my prior Patent 2,258,941.

The connector of my Patent 2,258,941 was designed to provide a double seal against the admission of moisture to the terminal box, meter, or other housing to which the connector is secured. My earlier connector was formed of a cylindrical sleeve surrounding the cable and containing an annular ring of permanently plastic adhesive material forming a seal between the inner surface of the sleeve and the outer surface of the cable, and a second seal is formed by an annular ring of rubber or other resilient material forced into contact with the ring of plastic material and compressed so as to maintain a water-tight seal between the inner surface of the sleeve and the external surface of the cable.

My improved connector of the present invention is designed to secure a double seal against the admission of moisture, but the parts are rearranged and the number of parts is reduced.

According to the present invention, the ring of plastic sealing compound is located on the outside of the rubber ring, which results in a number of advantages.

First, it is possible to dispense with the fabric gasket and the metal backing ring used to support the ring of plastic material in my prior connector.

Secondly, the ring of plastic sealing material is not subjected to compression by the ring of rubber and the tendency of the plastic material to be squeezed out of the connector is eliminated.

Finally, by locating the ring of plastic material on the outside of the rubber ring, the plastic material protects the rubber ring from deterioration by the action of the atmospheric elements.

A further feature of the present invention is that only four parts are required, in the construction of the present invention, as against eight parts in my prior connector. The two screws for securing the cap to the connector are eliminated by the use of a screw cap.

Another feature is the provision of spaced ribs on the inner surface of the connector sleeve for holding the rubber ring against rotation with the screw cap.

Still another feature is the provision of an external shoulder on the connector sleeve, providing a flat annular surface for the seating of a sealing gasket where the connector is mounted in the knock-out hole.

My improved connector is illustrated in the accompanying drawing, in which:

Figure 1 is a perspective view showing the connector mounted upon a section of two-conductor cable, but with the ring of plastic material omitted;

Figure 2 is a longitudinal sectional view of Figure 1 showing the connector in section and the cable in elevation. This figure shows the ring of plastic material;

Figure 3 is a sectional view of Figure 2, taken along the line 3—3;

Figures 4, 5, and 6 show the principal elements of the connector arranged in aligned spaced relation on a somewhat larger scale than Figures 1 to 3; and Figure 7 is an end view of Figure 6 from the left end thereof.

Referring to the drawing, the connector is formed of a cylindrical sleeve 1 having a screw thread formed on the inner end 1a thereof for threaded engagement with a tapped hole in a meter casing or for receiving a mounting nut, not here shown, when the connector is to be mounted in a knock-out hole of a terminal box or any other housing into which the cable 2 has to be introduced. Near the middle of the sleeve, a circular flange 1b forms an abutment against which the wall C of the housing is clamped by the mounting nut D, see Figure 6. The flange 1b provides a flat annular surface forming a seat for a sealing gasket E when used. Adjacent this flange 1b is a "nut" section 1c formed of hexagonal shape so that a wrench may be employed to hold, or to turn, the connector in mounting it in the housing, see Figure 7.

The inner end portion 1a of the sleeve has a cylindrical inner surface of smaller internal diameter than that of the outer end portion 1d, providing a shoulder 1e inside the sleeve at the junction of the two sections, as shown in Figure 6. The inner wall of the outer end portion 1d of the sleeve is tapered or of frusto-conical form (at an angle of about 10 degrees to the sleeve axis) so that the internal diameter is largest at the open end of the sleeve, see Figure 6.

A ring-shaped plug or stopper 3, formed of resilient water-impervious material, such as rubber, is mounted within the tapered end section of sleeve 1, and its outer surface is tapered to conform with the inner tapered surface, but the larger end of plug 3 is of larger diameter than the open end of the sleeve. Also, the plug has a longer axial length than the length of the tapered section of the sleeve. The plug 3 is provided with a cable aperture 3a of such form as to conform closely with the cross-sectional shape of the cable. In the illustrated embodiment of the invention the cable 2 is of oval cross-section and the aperture 3a is of corresponding oval shape, as shown in Figure 3, but it will be understood that plugs having different shapes of apertures may be provided and interchangeably used with the sleeve 1.

At the outer end of the sleeve is arranged a detachable screw-cap 4, which is threaded to engage a screw thread formed on the outer end section 1d of the sleeve. This cap is formed with a circular aperture 4a in its top wall of such size as to allow the passage of whatever cable may be used with the connector. The outside edge of the cap is formed of hexagonal shape so that a wrench may be employed in turning it.

The annular portion 4b of the top wall of cap 4 is positioned to engage the outer portion of the large end of plug 3. Thus, as the cap is tightened on the sleeve, the rubber plug is forced into the tapered end of sleeve 1.

For the purpose of preventing any tendency of the plug 3 to turn with the cap 4, a number of projecting ribs 1f are formed on the tapered inner wall of the sleeve section 1d, these ribs being spaced about the axis of the sleeve and arranged parallel with the axis. As the cap 4 is turned on the sleeve, the plug 3 is forced into the tapered end of the sleeve and the ribs bite into the body of the plug to prevent the plug from turning. As the plug advances into the sleeve, a water-tight seal is formed between the outer surface of the plug and the inner tapered surface of the sleeve. At the same time, the material of the plug is forced into water-tight engagement with the outer surface of the cable. When the inner end of the plug comes into engagement with the shoulder 1e at the inner end of the tapered section of the sleeve, the shoulder serves to retard further inward movement of the plug and to cause increased inward expansion of the plug into contact with the cable.

For the purpose of sealing the rubber plug from deterioration, an annular ring 5 of a plastic adhesive sealing compound (such as a material commonly known as "Duxseal") is placed around cable 2 to fill the open portions of the aperture in cap 4, as shown in Figure 2. This seals the exposed end portion of the rubber plug 3 and prevents exposure of the plug to atmospheric action.

For the purpose of providing each connector with the required amount of sealing compound, and in a place convenient for application, the sealing compound is arranged in the form of a ring 5a located within the screw cap 4 adjacent the annular portion 4b of the top wall and located between the top wall of the cap and the outer end of the plug 3, it being understood that the cap, at the time of shipment of the connector, has only limited threaded engagement with the sleeve in order to provide space for the ring 5a in the cap. When the connector is applied to a cable and the cap is tightened against the plug, this compound will squeeze out and may be wiped around the cable in the aperture 4a of the cap so as to seal the exposed end of the plug against weathering and aging action.

The compression of the resilient plug 3 into the tapered end of the sleeve by the screw cap 4 serves to produce a water-tight seal between the plug and the sleeve and between the plug and the cable, as already described, and the expansion of the plug into contact with the surface of the cable also tends to prevent slippage of the cable through the connector.

I claim:

1. A connector for an electric cable comprising a sleeve surrounding said cable and providing an annular space therein surrounding said cable, one end section of said sleeve having a screw-thread formed on the outer surface thereof and having an inner surface of frusto-conical form, a stopper ring of resilient water-impervious material surrounding said cable within said frusto-conical section of said sleeve, said stopper ring being tapered on the outside to conform with the tapered inner wall of said sleeve and having a portion thereof of greater diameter than said annular space, a screw-cap screwed on said screw-thread and engaging said stopper ring to force the ring into said sleeve and thereby to press said ring inwardly against said cable, a plurality of ribs formed on the inner tapered surface of said sleeve at spaced points about the axis thereof and arranged parallel with said axis to prevent turning of said ring with said screw-cap, said screw-cap having a cable-receiving aperture presenting open spaces therein around said cable, and a ring of adhesive permanently-plastic sealing compound surrounding said cable and filling the open spaces in the cable-receiving aperture of said screw-cap.

2. A connector for an electric cable comprising a sleeve having a central opening for receiving said cable and providing an annular space therein surrounding the cable, one end section of said sleeve having a tapered internal surface and having a screw-thread formed on its external surface, a tapered ring of resilient water-impervious material arranged within said tapered section of said sleeve and having a portion thereof of greater diameter than the largest diameter of said tapered sleeve portion, a screw-cap screwed on said screw-thread and having a central opening for receiving said cable, and a ring of adhesive permanently-plastic sealing compound supported within said screw-cap surrounding the central opening therein and located within the space between the top wall of the cap and the outer end of said tapered ring.

3. A connector for an electric cable comprising a sleeve having a central opening for receiving said cable and providing an annular space therein surrounding the cable, one end section of said sleeve having a tapered internal surface and having a screw-thread formed on its external surface, a tapered ring of resilient water-impervious material arranged within said tapered section of said sleeve and having a portion thereof of greater diameter than the largest diameter of said tapered sleeve portion, a screw-cap screwed on said screw-thread and having a central opening for receiving said cable, a plurality of ribs formed on the inner tapered surface of said sleeve at spaced points about the axis thereof and arranged parallel with said axis, to prevent turning of said tapered ring with said screw-cap, and a ring of adhesive permanently-plastic sealing compound supported within said screw-cap surrounding the central opening therein and located within the space between the top wall of the cap and the outer end of said tapered ring.

4. A connector for an electric cable comprising a cylindrical sleeve having a screw-thread formed on one end portion thereof for receiving a mounting nut, a radial flange formed on said sleeve at the inner end of said screw-thread and providing a flat annular surface for seating a sealing gasket between said flange and said mounting nut, the other end portion of said sleeve having a screw-thread formed on its outer surface, a screw-cap threaded on said other end and having a circular aperture for receiving said cable, said other end portion having a tapered inner wall provided with a plurality of ribs formed thereon at spaced points about the axis of said sleeve and arranged parallel with said axis, tapered ring of resilient water-impervious material arranged within the tapered portion of said sleeve, and a ring of adhesive permanently-plastic sealing compound supported within said screw-cap surrounding the central opening therein and located within the space between the top wall of the cap and the outer end of said tapered ring.

ALBERT J. WAYMAN.

References Cited in the file of this patent

UNITED STATES PATENTS

| Number | Name | Date |
|---|---|---|
| 1,777,518 | Dunmire | Oct. 7, 1930 |
| 2,015,953 | McDowell | Oct. 1, 1935 |
| 2,258,941 | Wayman | Oct. 14, 1941 |
| 2,281,654 | Wulle et al. | May 5, 1942 |
| 2,452,184 | Cole | Oct. 26, 1948 |

FOREIGN PATENTS

| Number | Country | Date |
|---|---|---|
| 330,269 | Great Britain | June 4, 1930 |